US009218848B1

(12) United States Patent
Waggoner (10) Patent No.: US 9,218,848 B1
(45) Date of Patent: Dec. 22, 2015

(54) RESTRUCTURING VIDEO STREAMS TO SUPPORT RANDOM ACCESS PLAYBACK

(71) Applicant: Amazon Technologies, Inc., Reno, NV (US)

(72) Inventor: Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 14/321,387

(22) Filed: Jul. 1, 2014

(51) Int. Cl.
*H04N 21/2387* (2011.01)
*G11B 27/30* (2006.01)

(52) U.S. Cl.
CPC .................................. *G11B 27/3036* (2013.01)

(58) Field of Classification Search
None
See application file for complete search history.

(56) References Cited

U.S. PATENT DOCUMENTS

| 2003/0095790 | A1* | 5/2003 | Joshi | G11B 27/034 386/248 |
| 2003/0231863 | A1* | 12/2003 | Eerenberg | H04N 5/783 386/346 |
| 2012/0170642 | A1* | 7/2012 | Braness | G11B 27/005 375/240.01 |
| 2013/0294743 | A1* | 11/2013 | Thornberry | G11B 27/034 386/239 |

* cited by examiner

*Primary Examiner* — Hung Dang
*Assistant Examiner* — Sunghyoun Park
(74) *Attorney, Agent, or Firm* — Weaver Austin Villeneuve & Sampson LLP (57) ABSTRACT

Techniques are described for dynamically restructuring an encoded video stream to support a wide range of high-speed playback with accompanying visual feedback of the underlying video content. For a particular range of playback speeds, frames in each fragment are retained or dropped based on the encoded dependencies among the frames in the fragment and the selected playback speed. The set of frames in each fragment is analyzed to determine the optimal pattern of frames to retain or drop for a given playback speed. The time stamps of the retained frames are adjusted to achieve the proper spacing for the decoder.

20 Claims, 4 Drawing Sheets

RESTRUCTURING VIDEO STREAMS TO SUPPORT RANDOM ACCESS PLAYBACK

BACKGROUND

Supporting navigation through video content delivered via adaptive streaming is technically challenging; particularly if the goal is to provide high quality visual feedback of the content during high-speed navigation. Network bandwidth constraints and decoder limitations make it impractical to increase playback speed as the primary mechanism to support high-speed navigation. A variety of alternative solutions have attempted to support navigation with some form of visual feedback, but none provides a user experience that approaches the visual fidelity that can be achieved using the analogous navigation functions of, for example, a DVD or Blu-ray Disc player.

One approach generates image files (e.g., JPEG files) of video frames selected from the source video at fixed intervals. These files are then made available for random access, e.g., by "scrubbing" through a visual timeline. In addition to being duplicative of the original content, these image files use an inefficient data format and typically have a lower image quality than the native video format. Moreover, the arbitrary selection of frames at fixed intervals often results in many of the images not being useful for the intended purpose. For example, arbitrarily selected frames might correspond to a fade between scenes and therefore may not contain much if any useful visual information. A similar approach uses frames selected from the source video as the display images for navigation. This is more efficient than generating additional image files but, because these frames are selected at fixed intervals, the displayed images may still not correlate with useful frames.

An alternative class of solutions allows a user to skip ahead or back to preselected locations in video content, e.g., the beginning of a chapter, a commercial break, or an arbitrary time interval. However, as will be appreciated, such approaches are not well suited for enabling a user to navigate to a precise point in a video.

DETAILED DESCRIPTION

This disclosure describes techniques for dynamically restructuring an encoded video stream to support a wide range of high-speed playback with accompanying visual feedback of the underlying video content. For a particular range of playback speeds, a subset of the video frames in each video fragment (also known as a "Group of Pictures" or "GOP") are retained based on the encoded dependencies among the frames in the fragment and the selected playback speed. The set of frames in each fragment is analyzed to determine the optimal pattern of frames to keep for a given playback speed. The time stamps of the retained frames are then adjusted to achieve the proper spacing for the decoder. According to some implementations, frame selection and timing are optimized to get the smoothest viewer experience (i.e., to preserve the temporal smoothness of the frames) given the technical constraints of the encoded stream and the decoder.

According to a particular class of implementations, selection of the frames to drop (or keep) for very-high-speed playback is governed by a predetermined pattern of frame types for each playback speed. High-speed video fragments conforming to the pattern for the selected playback speed are constructed from the encoded video, with the frame pattern for higher and higher speeds becoming sparser in terms of the number of frames that are retained for each fragment.

Figure 1:
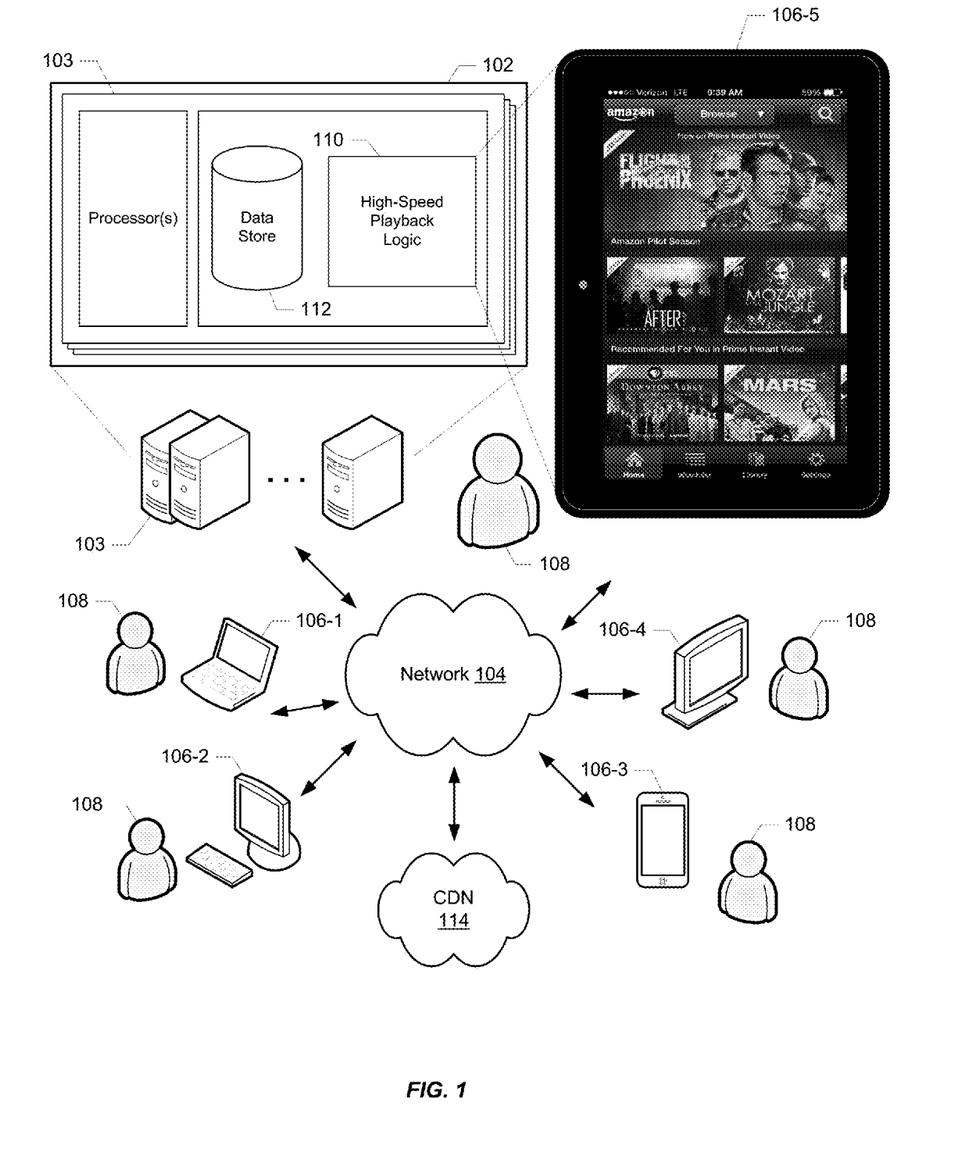
FIG. 1 illustrates an example of a network environment in which video content may be delivered as described herein.

FIG. 1 illustrates an example of a computing environment in which high-speed playback of video content is supported in conjunction with the use of a video content service 102 via network 104 by a variety of client devices (106-1 through 106-5) associated with users 108. Video content service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable device capable of connecting to network 104 and consuming video content provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling video content service 102. Alternatively, such resources may be independent of video content service 102, e.g., on a platform under control of a separate provider of computing resources with which video content service 102 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

In the following example and for the sake of simplicity, video content service 102 is described as if it were integrated with the platform(s) that stores and streams the video content to client devices. Alternatively, video content service 102 may provide access to content in conjunction with one or more content delivery networks (e.g., CDN 114) that may or may not be independent of video content service 102. Other variations are contemplated to be within the scope of the invention.

Video content service 102 may include high-speed playback logic 110 that facilitates at least some aspects of the high-speed playback of video content. Video content service 102 may also include user account information (e.g., in data store 112) as well as business logic (not shown) that governs the operation of the service and management of user accounts. According to some implementations, data store 112 may also include the video content to which the service 102 provide access. Alternatively, content may be provided and/or hosted by one or more separate platforms, e.g., CDN 114. It should be noted that, while high-speed playback logic 110 and data store 112 are contemplated as integrated with video content service 102, implementations are contemplated in which either or both operate remotely from the associated content service, and/or either or both are under the control of an independent entity. And as will be discussed, implementations are also contemplated in which much of the functionality relating to high-speed playback is implemented on the client device consuming the video content, e.g., device 106-5 (as indicated by the dashed lines).

Figure 2:
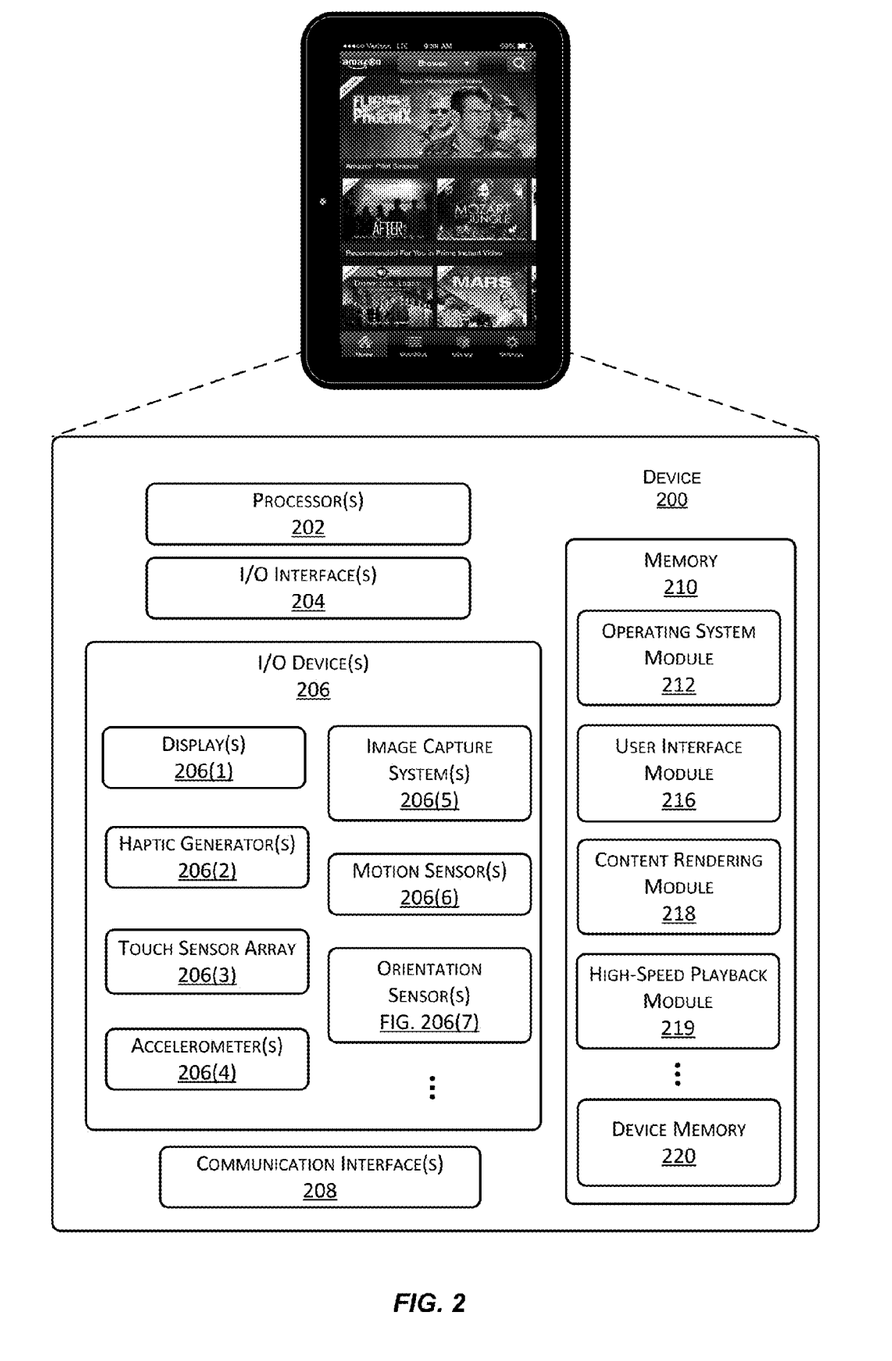
FIG. 2 is a simplified block diagram of an electronic device that may be employed with various implementations.

A block diagram of an example of such a client device 200 is shown in FIG. 2. Device 200 includes one or more single or multi-core processors 202 configured to execute stored instructions (e.g., in device memory 220). Device 200 may also include one or more input/output (I/O) interface(s) 204 to allow the device to communicate with other devices. I/O interfaces 204 may include, for example, an inter-integrated circuit (12C) interface, a serial peripheral interface (SPI) bus, a universal serial bus (USB), an RS-232 interface, a media device interface, and so forth. I/O interface(s) 204 is coupled to one or more I/O devices 206. The I/O device(s) 206 may include one or more displays 206(1), one or more haptic generators 206(2), a touch sensor array 206(3), one or more accelerometers 206(4), one or more image capture systems 206(5), one or more motion sensors 206(6), one or more orientation sensors 206(7), microphones, speakers, and so forth. The one or more displays 206(1) are configured to provide visual output to the user and may comprise any of a variety of display types including, for example, any type of reflective or transmissive display. Touch sensor array 206(3) may be a capacitive sensor array having a matrix of conductors that are scanned to determine, for example, the location, duration, speed and direction of touch events within the matrix based on changes in electrical capacitance.

Device 200 may also include one or more communication interfaces 208 configured to provide communications between the device and other devices. Such communication interface(s) 208 may be used to connect to cellular networks, personal area networks (PANs), local area networks (LANs), wide area networks (WANs), and so forth. For example, communications interfaces 208 may include radio frequency modules for a 3G or 4G cellular network, a WiFi LAN and a Bluetooth PAN. Device 200 also includes one or more buses or other internal communications hardware or software that allow for the transfer of data and instructions between the various modules and components of the device.

Device 200 also includes one or more memories (e.g., memory 210). Memory 210 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 210 provides storage for computer readable instructions, data structures, program modules and other data for the operation of device 200. Memory 210 includes at least one operating system (OS) module 212 configured to manage hardware resources such as I/O interfaces 204 and provide various services to applications or modules executing on processor(s) 202. Memory 210 also includes a user interface module 216, a content rendering module 218, and other modules.

Memory 210 also includes device memory 220 to store a wide variety of instructions and information using any of a variety of formats including, for example, flat files, databases, linked lists, trees, or other data structures. Such information includes content for rendering and display on display 206(1) including, for example, any type of video content. In some implementations, a portion of device memory 220 may be distributed across one or more other devices including servers, network attached storage devices, and so forth.

The logic or computer program instructions used to support high-speed playback of video content as described herein (represented by high-speed playback module 219) may be implemented in a variety of ways. For example, at least some of this functionality may be part of or associated with the native decoder logic of device 200, and may be implemented in software, firmware, hardware, or some combination of these. In another example, at least some of this functionality may be implemented in the code of a media player operating on device 200. And as mentioned above, at least a portion of the logic or computer program instructions may reside on a separate platform, e.g., service 102, CDN 114, etc. Suitable variations and alternatives will be apparent to those of skill in the art. It will also be understood that device 200 of FIG. 2 is merely an example of a device with which various implementations of the present invention may be practiced, and that a wide variety of other devices types may also be used (e.g., devices 106-1 to 106-5). The scope of the invention should therefore not be limited by reference to device-specific details discussed above.

Figure 3:
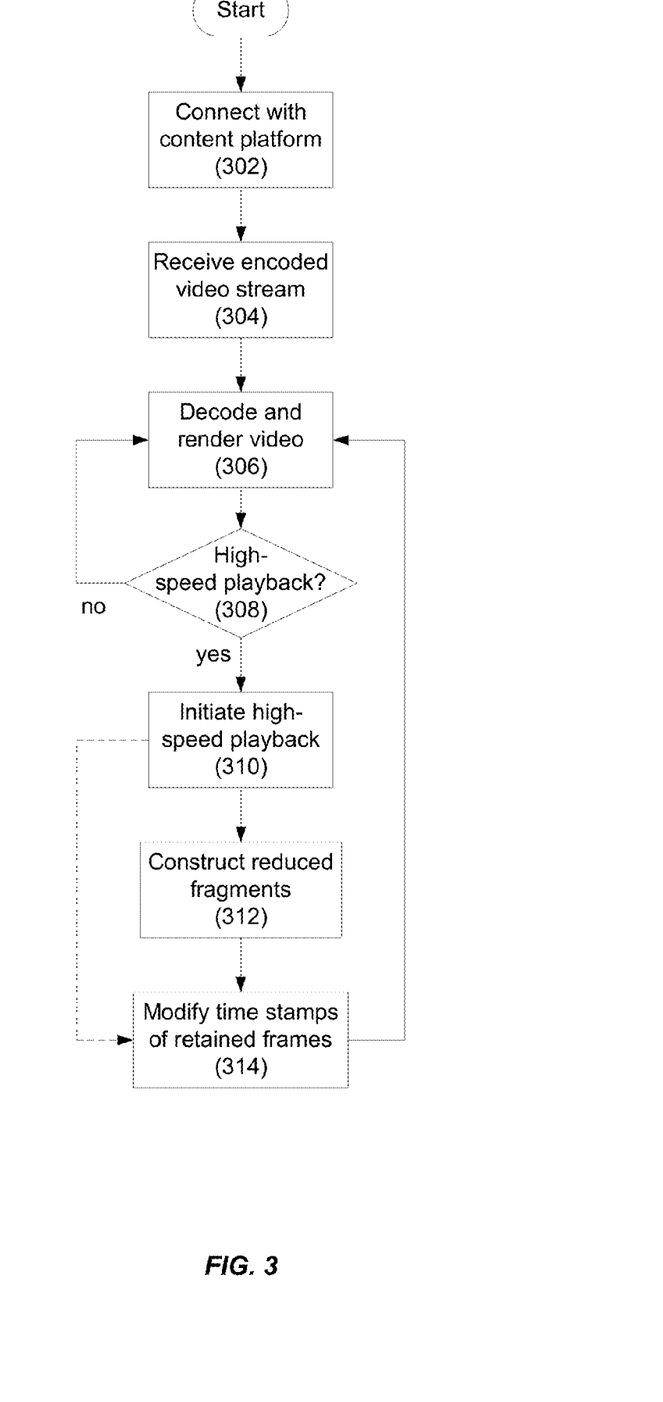
FIG. 3 is a flow diagram illustrating operation of a particular class of implementations.

High-speed playback of video content on a client device according to a particular implementation is illustrated in the flow chart of FIG. 3. As will be discussed, a conventionally encoded video stream is reconstructed in a way that enables high-speed playback on the device's media player (which may be a conventional player) with associated visual feedback that allows the user to see the underlying video content. The depicted example assumes the use of the H.264 encoding. However, it will be understood that the basic principles described herein may be employed with any of a variety of codecs including, for example, MPEG-1, MPEG-2, MPEG-4 Part 2, VC-1, H.263, VP9, and H.265 (also commonly referred to as HEVC). As will also be understood, and depending on the application, there can be considerable variability in how structured some encoding formats like MPEG can be. For clarity and brevity, examples in the following discussion assumes efficient encoding of video content for high quality playback at normal speed, e.g., High Definition (HD) at 24 frames per second. It also assumes a media player and a server architecture designed to efficiently deliver this video content in a way that attempts to minimize the number of streams and the amount of data stored in CDNs. However, it should be understood that implementations are contemplated in which neither of these assumptions is the case. It should also be noted that the playback speed ratios (relative to normal speed) to which the following discussion refers are merely examples to illustrate the basic principles involved. A wide variety of playback speed ratios may be achieved and may depend, for example, on the nature of the video content, the encoding scheme, the capabilities of the decoder, etc.

Referring now to FIG. 3, a media player on a client device, e.g., client device 106-5, establishes a connection with a remote video content platform, e.g., CDN 114, (302) over which the client receives an encoded video stream (304). The encoded video stream may be encoded, for example, using H.264 encoding. The encoded video stream is received by a demultiplexer which separates the various encoded media streams (e.g., including video and audio streams) and provides them to their respective decoders. According to a particular class of implementations, at least some of the high-speed playback logic is implemented in the video handling portion of the demultiplexer.

The demultiplexer passes the unpacked but still encoded video frames to the video decoder which decodes them and passes them along for rendering and display at normal speed by the device's media player (306). When the user initiates high-speed playback (308), a message is sent to the high-speed playback logic (e.g., in the demultiplexer) to initiate high-speed playback at a particular playback speed, e.g., 2×, 4×, 8× . . . 256×, etc., (310). High-speed playback may be initiated by the user in a variety of ways including, for example, selection of a high-speed playback control in the media player user interface. Specification of the playback speed may be enabled by selection of a corresponding control, manipulation of a dial or slider control (e.g., "scrubbing"), repeated selection of a high-speed playback control, etc.

In response to the initiation of high-speed playback, the high-speed playback logic determines for each video fragment which frames to retain or drop based on the selected playback speed and the dependencies among the video frames in that fragment (312). As mentioned above and as described below with reference to specific examples, the retained video frames in each fragment are selected in an attempt to preserve temporal smoothness on the display of the client device during high-speed playback; at least for some of the playback speeds. According to some implementations and/or for some playback speeds this is accomplished by making decisions about which frames to drop or retain in order to preserve a more uniform distribution of the temporal gaps between retained frames in the playback order of the frames, or at least to mitigate the worst case temporal gaps.

The time stamps associated with the retained video frames in each fragment are then adjusted to achieve an appropriate spacing for the decoder (314). For example, for playback at normal speed, the decoder may be configured to process frames using a playback interval of about 40 ms. Therefore, depending on which frames are dropped, the time stamps of the remaining frames are modified so that they are about 40 ms apart. The demultiplexer then passes the retained video frames to the decoder which decodes them and passes them along for rendering and display by the device's media player (306). It should be noted that different fragments in an encoded video stream may have different playback intervals associated with their respective frames and that this may be taken into account when selecting frames and adjusting times stamps to achieve a particular playback speed. And as will be discussed, the capabilities of the decoder may be leveraged to use different playback intervals to achieve at least some playback speeds without dropping any frames.

Implementation of the high-speed playback logic in the demultiplexer of the client device can be advantageous in that, even though the video content remains encoded, the demultiplexer has access to an unencrypted index associated with each video fragment of the encoded video stream that identifies the frame types in that fragment and their time stamps. This allows logic in the demultiplexer to make decisions about which frames to pass along to the decoder and to adjust the timing of remaining frames accordingly. And because this may be implemented in the demultiplexer of the client, the rate at which the video is being streamed or downloaded to the client, or rendered and displayed by the media player need not be affected. It should also be noted that, while decoding and display functions may execute using secure memory on the client device, implementations are contemplated in which high-speed playback executes in either secure or non-secure memory.

According to implementations for H.264 encoded streams, each fragment includes several frame types; with the frame type defining the kind of dependency allowed for that frame. In general, dependencies between frames are used to support data compression, i.e., understanding how frames before or after a frame are similar allows encoding only the differences between nearby frames in the same fragment, resulting in significant improvements in bit rate.

An Instantaneous Decoder Refresh (IDR or I) frame is the first frame of every fragment and does not depend on any other frames, i.e., it can be decoded without reference to any other frame. An I frame indicates to the decoder that everything that has happened up to that point in the encoded video stream is no longer relevant, i.e., it resets the decoder.

Non-IDR independent (i) frames are similar to an I frame in they don't reference other frames. However, i frames (which are comparatively rare) don't reset the decoder like an I frame.

Predictive (P) frames can reference a I, i, or P frame, but no B or b frames (defined below). If a P frame fails to decode, generally no more frames can be played for the rest of the fragment.

Reference bidirectional (B) frames can reference a prior I frame (i.e., the one that begins the same fragment), and prior or subsequent i, P, or B frames, but no b frames. If a B frame fails to decode, generally no more frames can be played until the next P (or in some cases B) frame in the fragment is decoded, i.e., if a B frame is dropped playback can be resumed at a subsequent P (or B) frame.

Non-reference bidirectional (b) frames can reference any prior or subsequent frame of any type other than another b frame, i.e., no other frame types reference b frames. Failure to decode a b frame has no impact on playback of future frames. Typically more than half of the frames of a fragment are b frames. In some codec versions, multiple tiers of b frames can exist. However, for the sake of clarity, the examples described herein refer to only a single tier of b frames. It should be noted, however, that this should not be used to limit the scope of the invention. That is, implementations are contemplated in which high-speed playback is enabled for codecs that employ multiple tiers of b frames.

According to a particular class of implementations, the high-speed playback logic attempts to optimize frame selection and timing for each video fragment to get the smoothest viewer experience (temporal smoothness of frames) given the technical constraints of the encoded video stream and the decoder. The high-speed playback logic identifies the frame types in a fragment and how the frames reference each other from the fragment's index. The logic then determines how many and which of the frames in the fragment should be dropped to achieve the selected playback speed, e.g., about ½ of the frames to achieve 2×, about ¾ of the frames to achieve 4×, etc.

In some implementations, the logic may take a hierarchical approach in which the significance of the frame types is a primary consideration in determining which frames are dropped or retained for a given playback speed; with frame types of increasing significance being selected for dropping to achieve higher and higher speeds, e.g., in the order b, B, P, i, I. In some of these implementations, frames could be naively dropped, e.g., based strictly on ordering of frame types. However, implementations with more sophisticated decision making are contemplated to achieve a higher quality visual presentation.

Figure 4:
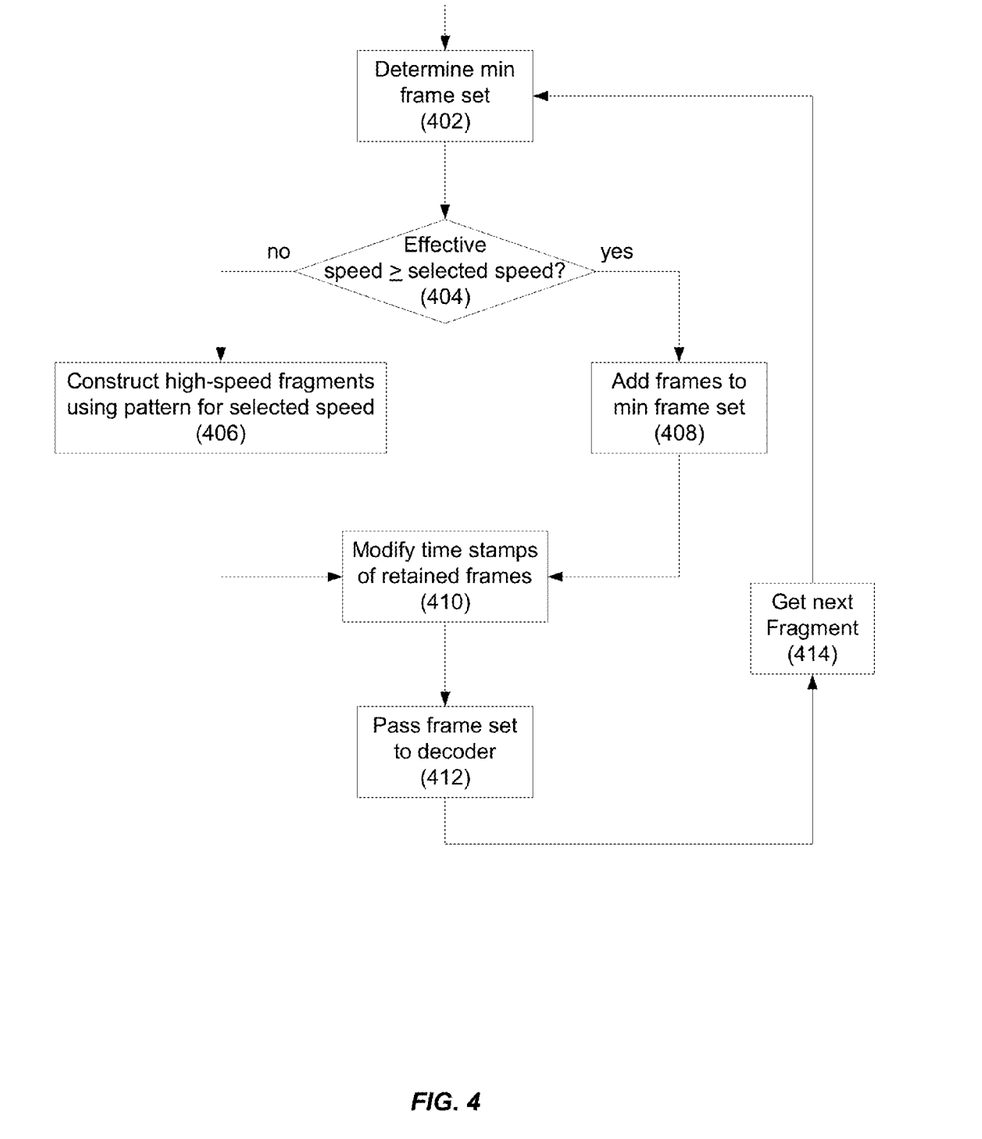
FIG. 4 is a flow diagram illustrating operation of a specific implementation.

According to a particular class of implementations, the high-speed playback logic attempts to retain as many frames in each fragment as possible for a given playback speed (taking into account the speed of the decoder) while minimizing or reducing the worst-case temporal gaps between retained frames in the playback order. An example of how this may be achieved is illustrated in the flowchart of FIG. 4.

As mentioned above, the types of frames in a received fragment may be identified from the fragment's unencrypted index. A minimum playable set of frames for the fragment is determined that includes the fragment's I and P frames (402). This set of frames may be the basis for a larger set of frames that are retained for playback and is referred to as "minimum" in that if a P frame is dropped, no subsequent frames in that fragment would be playable even if ultimately included in the set for playback. If this set of I and P frames is not sufficiently small to achieve the selected playback speed (404) (i.e., the number of frames is too great to achieve the selected speed given capabilities of the decoder), very high-speed playback proceeds as follows.

That is, the point at which P frames must be dropped to achieve the selected playback speed, a more deterministic approach to the construction of high-speed fragments is employed (406) to achieve each of the higher playback speeds. This very-high-speed playback (e.g., 16× and above for a decoder operating at 30 frames per second) employs a uniform fragment construction with the appropriate number of frames (and timing) for the selected playback speed, e.g., about 1/16 of the frames of the original stream for 16× playback; about 1/32 of the frames for 32× playback, and so on. And as mentioned elsewhere herein, this very high-speed stream may be constructed at the client device, e.g., in the demultiplexer. Alternatively, the high-speed stream may be constructed at the server side, i.e., at the source of the streaming video. As will be appreciated, the latter approach can significantly reduce the amount of data being downloaded or streamed when supporting high-speed playback. As yet another alternative, the high-speed stream may be constructed and stored at any of a variety of platforms before playback begins. That is, the high-speed video fragments for different playback speeds may be pre-computed and streamed (e.g., instead of the normal speed playback stream) when high-speed playback is initiated. This may be particularly advantageous for very high-speed playback in that the storage overhead for very high playback speeds is not as great as for lower playback speeds. An example of a sequence of frames in the very high-speed stream for 16× playback (with a decoder operating at 30 frames per second) will be described, followed by a description of the modifications to that sequence to achieve higher playback speeds.

The first frame in the sequence of frames in each fragment is an I frame. In this example, the fragments for 16× playback include a P frame halfway through the sequence, a B frame a quarter of the way through and another B frame at three quarters of the way through, and b frames in between each pair of those frames—I b B b P b B b. Every 8th frame of the sequence then start with the I frame of a new fragment. In this example, 16× playback involves playing back this sequence of frames of each fragment. To double this playback speed, e.g., 32×, all of the b frames are dropped from this sequence for each fragment. To double it again, e.g., 64×, all the B frames are dropped; for 128× all the P frames dropped; for 256× the I frames from every other fragment are played; for 512× every fourth I frame, etc.

According to some implementations, very-high-speed playback may be achieved with a uniform fragment type construction while still employing some intelligence about the frames chosen from each fragment for inclusion in the high speed stream for playback. For example, it may not be desirable to retain frames that are all black or in a fade between scenes. Alternatively, frames with a lot of content or motion would be desirable to retain. By looking at the relative sizes and/or weighting parameters associated with the frames in the original encoded stream, the selection of frames to retain can be skewed to favor more desirable frames.

Referring back to FIG. 4, if the set of I and P frames is sufficiently small to achieve the selected playback speed or faster (404), other types of frames from the fragment are added to the set to achieve the desired playback speed (408). According to a particular class of implementations, the selection of frames to add to the set is done with an eye toward minimizing the distortion associated with large and/or uneven temporal gaps between frames retained from the original sequence.

According to some implementations, this may initially involve the insertion of B frames followed by the insertion of b frames. The frames are inserted to fill in the biggest temporal gaps between frames in the current set, i.e., to reduce visual distortion. This might involve, for example, identification of the largest temporal gaps, insertion of one or more frames in those gaps, identification of the next largest gaps, insertion of frames in those gaps, and so on until the desired playback speed is reached (e.g., as represented by the ratio of the number of retained frames to the number of frames in the original fragment). In some implementations, the frames might be inserted based primarily on their temporal location in the sequence, e.g., the frames that correspond to the centers of the larger temporal gaps. Alternatively, frame selection may be weighted by considering frame size or reference index. For example, a very small frame in the perfect temporal location might be less valuable than a large frame in a slightly less temporally correct place, since the bigger frame likely has content.

According to some implementations, the decisions about which frames to include in the set can be weighted in favor of keeping frames that will result in a smoother visual appearance during playback. For example, there might be consecutive frames in a fragment (e.g., a P frame followed by a B frame) where it would be advantageous to preserve both frames to preserve the visual quality of the playback. When preserving consecutive frames (the relationship of which represents a 1× playback speed), other segments of the fragment may require more aggressive frame dropping to achieve the selected playback speed. In another example, frames of very small size could be assumed to be black or not changing much from a previous frame and so might be favored for dropping. In another example, frames having a lot of data might represent significant motion in the video and so might be favored for retaining.

By way of example, the decision making of the high-speed playback logic may have the following effects for different playback speeds for a video fragment having a statistically typical sequence of frames encoded for playback at 24 frames per second. These examples assume a decoder capable of decoding up to 30 frames per second. For 1× playback, all of the frames in a fragment are played. For 2× playback, close to every other frame (typically and optimally a b frame) might be dropped to maintain smoothness at 30 frames per second. Some frame timing adjustments are likely required given the existence of other frame types in the sequence.

For 4× playback, nearly all b frames might be dropped with some additional timing adjustments to keep playback smooth. For 8× playback, all b and most B frames might be dropped. As mentioned above, these examples assume a decoder configured for operation up to 30 frames per second. For a decoder able to operate at 60 frames per second, the described scenarios may be associated with higher playback speeds (e.g., a factor of 2 higher). It should also be noted that, depending on the capabilities of the decoder, some speeds of high-speed playback may be enabled without dropping any frames. That is, for decoders that can operate at higher frame rates, some lower playback speeds (e.g., ½×, 2×, 3×, etc.) may be accomplished by adjusting the time stamps of the frames in each fragment to achieve the desired playback speed. This is indicated in FIG. 3 by the dashed line bypassing 312.

According to some implementations and as mentioned above, the decision making of the high-speed playback logic may also be based on characteristics of the decoder. For example, if the encoded video stream is encoded for playback at 24 frames per second, and the decoder is configuration for operation at up to 30 frames per second, the high-speed playback logic may be configured to drop some frames in support of higher-speed playback after decoding. More generally, the ratio between the frame rate of the fragment and the maximum frame rate of the decoder can be taken into account when deciding which and how many frames to drop. In addition, the frame rate of the display may also need to be considered. For example, the high-speed playback logic might not be able to take advantage of the maximum frame rate of the decoder (e.g., 60 frames per second) if the display has a lower maximum frame rate (e.g., 30 frames per second). These are additional examples of constraints that may be taken into account by the high-speed playback logic in deciding which frames to keep and what time stamps to give them.

Referring again to FIG. 4, once the high-speed fragment is constructed (regardless of which technique), the time stamps of the retained frames are adjusted to achieve an appropriate spacing for the decoder (410). The retained frames are then passed to the decoder for playback (412) and the next fragment is processed (414).

According to a one class of implementations, the fragments at the server side may be packed and downloaded in tier order rather than decode order, i.e., grouping frames in chunks of the same frame type, e.g., all of the I frames, all of the P frames, etc. This would allow for the client to request only certain types of frames based on the selected playback speed, e.g., to request only I, P and B frames. This effectively prunes the data being streamed or downloaded based on a statistical understanding of the kinds of frames likely to be dropped for a particular playback speed. This would not only support high-speed playback, but would also reduce the amount of resources required on the server side to deliver the content.

Some examples of the way in which the frames of a fragment might be retained or dropped for different playback speeds will be instructive. Each of the following tables shows the original frames of a representative fragment and examples of the retained frames for playback speeds of 2×, 4×× and 8×. Each table assumes a particular decoder speed (e.g., 30 or 60 frames per second).

Table 1 illustrates an example in which frames are retained for a fragment including 120 frames (13575-13694) for 2×, 3×, 4×, 6× and 8× playback speeds. The decode is a 4× decoder, i.e., capable of operating at 120 frames per second.

TABLE 1

| in | out | type | 2× | 3× | 4× | 6× | ~8× |
|---|---|---|---|---|---|---|---|
| 13575 | 13575 | I | I | I | I | I | I |
| 13576 | 13578 | b | | | | | |
| 13577 | 13579 | b | b | | | | |
| 13578 | 13580 | b | | b | | | |
| 13579 | 13581 | b | b | | | | |
| 13580 | 13582 | b | | | | | |
| 13581 | 13577 | B | B | B | B | | |
| 13582 | 13583 | b | | | | | |
| 13583 | 13584 | b | b | | | | |
| 13584 | 13585 | b | | | | | |
| 13585 | 13586 | b | b | | | | |
| 13586 | 13576 | P | P | P | P | P | P |
| 13587 | 13589 | b | | | | | |
| 13588 | 13590 | b | b | | | | |
| 13589 | 13591 | b | | b | | | |
| 13590 | 13592 | b | b | | | | |
| 13591 | 13593 | b | | | | | |
| 13592 | 13588 | B | B | B | B | B | |
| 13593 | 13594 | b | | | | | |
| 13594 | 13595 | b | b | | | | |
| 13595 | 13596 | b | | b | | | |
| 13596 | 13597 | b | b | | | | |
| 13597 | 13598 | b | | | | | |
| 13598 | 13587 | P | P | P | P | P | P |
| 13599 | 13601 | b | | | | | |
| 13600 | 13602 | b | b | | | | |
| 13601 | 13600 | B | B | B | | | |
| 13602 | 13603 | b | | | | | |
| 13603 | 13604 | b | b | | | | |
| 13604 | 13599 | P | P | P | P | P | P |
| 13605 | 13607 | b | | | | | |
| 13606 | 13608 | b | b | | | | |
| 13617 | 13609 | b | | b | | | |
| 13608 | 13610 | b | b | | | | |
| 13699 | 13611 | b | | | | | |
| 13610 | 13606 | B | B | B | B | | |
| 13611 | 13612 | b | | | | | |
| 13612 | 13613 | b | b | | | | |
| 13613 | 13614 | b | | b | | | |
| 13614 | 13615 | b | b | | | | |
| 13615 | 13616 | b | | | | | |
| 13616 | 13605 | P | P | P | P | P | |
| 13617 | 13617 | i | i | I | i | i | i |
| 13618 | 13620 | b | | | | | |
| 13619 | 13621 | b | | | | | |
| 13620 | 13619 | B | B | B | B | | |
| 13621 | 13622 | b | b | | | | |
| 13622 | 13623 | b | | | | | |
| 13623 | 13618 | P | P | P | P | P | P |
| 13624 | 13626 | b | | | | | |
| 13625 | 13627 | b | | | | | |
| 13626 | 13625 | B | B | B | | | |
| 13627 | 13628 | b | | | | | |
| 13628 | 13624 | P | P | P | P | P | P |
| 13629 | 13631 | b | | | | | |
| 13630 | 13632 | b | | | | | |
| 13631 | 13630 | B | B | B | B | | |
| 13632 | 13633 | b | | | | | |
| 13633 | 13634 | b | b | | | | |
| 13634 | 13629 | P | P | P | P | P | P |
| 13635 | 13637 | b | | | | | |
| 13636 | 13638 | b | b | | | | |
| 13637 | 13639 | b | | | | | |
| 13638 | 13636 | B | B | B | B | | |
| 13639 | 13640 | b | | | | | |
| 13640 | 13641 | b | | | | | |
| 13641 | 13635 | P | P | P | P | P | P |
| 13642 | 13644 | b | | | | | |
| 13643 | 13645 | b | | | | | |
| 13644 | 13643 | B | B | B | | | |
| 13645 | 13646 | b | | | | | |
| 13646 | 13642 | P | P | P | P | P | P |
| 13647 | 13649 | b | | | | | |
| 13648 | 13650 | b | b | | | | |
| 13649 | 13648 | B | B | B | B | | |
| 13650 | 13651 | b | | | | | |
| 13651 | 13652 | b | | | | | |
| 13652 | 13647 | P | P | P | P | P | P |

TABLE 1-continued

| in | out | type | 2x | 3x | 4x | 6x | ~8x |
|---|---|---|---|---|---|---|---|
| 13653 | 13655 | b | | | | | |
| 13654 | 13656 | b | b | | | | |
| 13655 | 13657 | b | | b | | | |
| 13656 | 13658 | b | b | | | | |
| 13657 | 13659 | b | | | | | |
| 13658 | 13654 | B | B | B | B | | |
| 13659 | 13660 | b | | | | | |
| 13660 | 13661 | b | b | | | | |
| 13661 | 13662 | b | | b | | | |
| 13662 | 13663 | b | b | | | | |
| 13663 | 13664 | b | | | | | |
| 13664 | 13653 | P | P | P | P | P | P |
| 13665 | 13667 | b | | | | | |
| 13666 | 13668 | b | b | | | | |
| 13667 | 13669 | b | | | | | |
| 13668 | 13666 | B | B | B | B | | |
| 13669 | 13670 | b | | | | | |
| 13670 | 13671 | b | b | | | | |
| 13671 | 13672 | b | | | | | |
| 13672 | 13665 | P | P | P | P | P | P |
| 13673 | 13675 | b | | | | | |
| 13674 | 13674 | B | B | | | | |
| 13675 | 13673 | P | P | P | P | P | P |
| 13676 | 13678 | b | | | | | |
| 13677 | 13677 | B | | | | | |
| 13678 | 13676 | P | P | P | P | P | P |
| 13679 | 13681 | b | | | | | |
| 13680 | 13682 | b | | | | | |
| 13681 | 13680 | B | B | B | B | | |
| 13682 | 13683 | b | | | | | |
| 13683 | 13684 | b | | | | | |
| 13684 | 13679 | P | P | P | P | P | P |
| 13685 | 13687 | b | b | | | | |
| 13686 | 13688 | b | | | | | |
| 13687 | 13686 | B | B | | | | |
| 13688 | 13689 | b | | | | | |
| 13689 | 13685 | P | P | B | P | P | P |
| 13690 | 13692 | b | | | | | |
| 13691 | 13693 | b | | | | | |
| 13692 | 13691 | B | B | B | | | |
| 13693 | 13694 | b | | | | | |
| 13694 | 13690 | P | P | P | P | P | P |

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving an encoded video stream with a client device, the encoded video stream representing video content and including a plurality of video fragments, each video fragment including a plurality of video frames, each of the video frames having a time stamp, at least some of the video frames in each video fragment having dependencies on others of the video frames in the corresponding video fragment;
facilitating normal-speed playback of the video content on a display of the client device by providing the video frames of first video fragments of the plurality of video fragments to a decoder, the decoder being configured to decode the encoded video stream for playback using a playback interval represented by the time stamps of the video frames;
receiving an indication to initiate high-speed playback of the video content at a first playback speed of a first plurality of playback speeds;
for each of second video fragments of the plurality of video fragments, determining which of the video frames to retain with reference to the first playback speed and the dependencies of the video frames resulting in a plurality of retained video frames for each of the second video fragments, at least some of the retained video frames being selected to reduce visual distortion on the display of the client device during the high-speed playback of the video content;
for each of the second video fragments, adjusting the time stamps associated with the retained video frames to facilitate playback of the retained video frames using the playback interval; and
facilitating high-speed playback of the video content at the first playback speed on the display of the client device by providing the retained video frames of the second video fragments to the decoder.

2. The method of claim 1, wherein high-speed playback of the video content at the first playback speed does not affect a bandwidth required to transmit the encoded video stream to the client device.

3. The method of claim 1, further comprising:
receiving a second indication to initiate high-speed playback of the video content at a second playback speed of a second plurality of playback speeds, all of the second plurality of playback speeds being higher than all of the first plurality of playback speeds;
for each of third video fragments of the plurality of video fragments, constructing a high-speed video fragment including a subset of the video frames from the corresponding third video fragment, each of the high-speed video fragments corresponding to a first pattern of frame types selected from a plurality of patterns of frame types, the first pattern of frame types corresponding to the second playback speed, each of the second plurality of playback speeds corresponding to a different one of the patterns of frame types; and
facilitating high-speed playback of the video content at the second playback speed on the display of the client device by providing the video frames of the third video fragments to the decoder.

4. The method of claim 1, further comprising, in response to the indication to initiate high-speed playback of the video content, requesting that the encoded video stream being transmitted to the client device exclude one or more subsets of the video frames, each subset of the video frames corresponding to a frame type, the one or more subsets of the video frames to be excluded from the encoded video stream being determined with reference to the first playback speed.

5. A computer-implemented method, comprising:
receiving an indication of high-speed playback of video content at a first playback speed, the video content being represented by an encoded video stream that includes a plurality of video fragments, each video fragment including a plurality of video frames, each of the video frames having a time stamp, at least some of the video frames in each video fragment having dependencies on others of the video frames in the corresponding video fragment;

for each of first video fragments of the plurality of video fragments, determining which of the video frames to retain with reference to the first playback speed and the dependencies of the video frames resulting in a plurality of retained video frames for each of the first video fragments; and for each of the first video fragments, adjusting the time stamps associated with the retained video frames to facilitate playback of the retained video frames using a playback interval used by a decoder configured to decode the encoded video stream.

6. The method of claim 5, wherein high-speed playback of the video content at the first playback speed does not affect a bandwidth required to transmit the encoded video stream to a client device for normal-speed playback.

7. The method of claim 5, further comprising:

receiving a second indication of high-speed playback of the video content at a second playback speed of a plurality of playback speeds, all of the plurality of playback speeds being higher than the first playback speed; and for each of second video fragments of the plurality of video fragments, constructing a high-speed video fragment including a subset of the video frames from the corresponding second video fragment, each of the high-speed video fragments corresponding to a first pattern of frame types selected from a plurality of patterns of frame types, the first pattern of frame types corresponding to the second playback speed, each of the plurality of playback speeds corresponding to a different one of the patterns of frame types.

8. The method of claim 5, further comprising, in response to the indication of high-speed playback, requesting that the encoded video stream exclude one or more subsets of the video frames before transmission to a client device, each subset of the video frames corresponding to a frame type, the one or more subsets of the video frames to be excluded from the encoded video stream being determined with reference to the first playback speed.

9. The method of claim 5, wherein the plurality of video frames in each video fragment includes an instantaneous decoder refresh frame (I-frame), one or more predictive frames (P-frames), one or more reference bidirectional frames (B-frames), and one or more non-reference bidirectional frames (b-frames).

10. The method of claim 5, wherein the playback interval used by the decoder is one of a plurality of playback intervals for which the decoder is configured, the method further comprising initiating high-speed playback of the video content at a second playback speed by configuring the decoder to operate using a corresponding one of the plurality of playback intervals.

11. The method of claim 5, wherein the indication of high-speed playback is received from a remote client device, the method further comprising transmitting the first video fragments including only the retained video frames to the client device.

12. The method of claim 5, further comprising receiving the encoded video stream with a client device, wherein determining which of the video frames to retain and adjusting the time stamps occurs at the client device.

13. A device, comprising:

memory;

a network interface configured to receive an encoded video stream representing video content, the encoded video stream including a plurality of video fragments, each video fragment including a plurality of video frames, each of the video frames having a time stamp, at least some of the video frames in each video fragment having dependencies on others of the video frames in the corresponding video fragment;

a decoder configured to decode the encoded video stream for playback using a playback interval represented by the time stamps of the video frames; and one or more processors configured to:

receive an indication of high-speed playback of the video content at a first playback speed;

for each of first video fragments of the plurality of video fragments, determine which of the video frames to retain with reference to the first playback speed and the dependencies of the video frames resulting in a plurality of retained video frames for each of the first video fragments; and for each of the first video fragments, adjust the time stamps associated with the retained video frames to facilitate playback of the retained video frames using the playback interval.

14. The device of claim 13, wherein high-speed playback of the video content at the first playback speed does not affect a bandwidth required to transmit the encoded video stream to the device for normal-speed playback.

15. The device of claim 13, wherein the one or more processors are further configured to:

receive a second indication of high-speed playback of the video content at a second playback speed of a plurality of playback speeds, all of the plurality of playback speeds being higher than the first playback speed; and for each of second video fragments of the plurality of video fragments, construct a high-speed video fragment including a subset of the video frames from the corresponding second video fragment, each of the high-speed video fragments corresponding to a first pattern of frame types selected from a plurality of patterns of frame types, the first pattern of frame types corresponding to the second playback speed, each of the plurality of playback speeds corresponding to a different one of the patterns of frame types.

16. The device of claim 13, wherein the one or more processors are further configured to, in response to the indication of high-speed playback, transmit a request to a remote platform that the encoded video stream exclude one or more subsets of the video frames before transmission to the device, each subset of the video frames corresponding to a frame type, the one or more subsets of the video frames to be excluded from the encoded video stream being determined with reference to the first playback speed.

17. The device of claim 13, wherein the plurality of video frames in each video fragment includes an instantaneous decoder refresh frame (I-frame), one or more predictive frames (P-frames), one or more reference bidirectional frames (B-frames), and one or more non-reference bidirectional frames (b-frames).

18. The device of claim 13, wherein the playback interval used by the decoder is one of a plurality of playback intervals for which the decoder is configured, and wherein the one or more processors are further configured to initiate high-speed playback of the video content at a second playback speed by configuring the decoder to operate using a corresponding one of the plurality of playback intervals.

19. A computer program product, comprising one or more non-transitory computer readable media having computer program instructions stored therein, the computer program instructions being configured such that, when executed by one or more processors, the computer program instructions cause the one or more processors to:
- receive an indication of high-speed playback of video content at a first playback speed, the video content being represented by an encoded video stream that includes a plurality of video fragments, each video fragment including a plurality of video frames, each of the video frames having a time stamp, at least some of the video frames in each video fragment having dependencies on others of the video frames in the corresponding video fragment;
- for each of first video fragments of the plurality of video fragments, determine which of the video frames to retain with reference to the first playback speed and the dependencies of the video frames resulting in a plurality of retained video frames for each of the first video fragments; and
- for each of the first video fragments, adjust the time stamps associated with the retained video frames to facilitate playback of the retained video frames using a playback interval used by a decoder configured to decode the encoded video stream.

20. The device of claim 19, wherein the computer program instructions are further configured to cause the one or more processors to:
- receive a second indication of high-speed playback of the video content at a second playback speed of a plurality of playback speeds, all of the plurality of playback speeds being higher than the first playback speed; and
- for each of second video fragments of the plurality of video fragments, construct a high-speed video fragment including a subset of the video frames from the corresponding second video fragment, each of the high-speed video fragments corresponding to a first pattern of frame types selected from a plurality of patterns of frame types, the first pattern of frame types corresponding to the second playback speed, each of the plurality of playback speeds corresponding to a different one of the patterns of frame types.

* * * * *